(12) United States Patent
Burges

(10) Patent No.: US 7,779,019 B2
(45) Date of Patent: Aug. 17, 2010

(54) LINEAR COMBINATION OF RANKERS

(75) Inventor: Christopher J. C. Burges, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 486 days.

(21) Appl. No.: 11/975,518

(22) Filed: Oct. 19, 2007

(65) Prior Publication Data

US 2009/0106229 A1   Apr. 23, 2009

(51) Int. Cl.
*G06F 7/00* (2006.01)
*G06F 17/30* (2006.01)
(52) U.S. Cl. ........................... 707/758; 707/759
(58) Field of Classification Search ................ 707/758, 707/759, 761, 763, 765, 767, 769
See application file for complete search history.

(56) References Cited

U.S. PATENT DOCUMENTS

| | | | |
|---|---|---|---|
| 6,269,368 B1 * | 7/2001 | Diamond | 707/6 |
| 6,463,426 B1 * | 10/2002 | Lipson et al. | 707/3 |
| 6,529,916 B2 * | 3/2003 | Bergman et al. | 707/104.1 |
| 6,578,040 B1 * | 6/2003 | Syeda-Mahmood | 707/102 |
| 6,654,742 B1 | 11/2003 | Kobayashi et al. | |
| 6,701,318 B2 | 3/2004 | Fox et al. | |
| 6,738,764 B2 | 5/2004 | Mao et al. | |
| 6,871,202 B2 | 3/2005 | Broder | |
| 7,188,106 B2 * | 3/2007 | Dwork et al. | 707/5 |
| 7,257,577 B2 | 8/2007 | Fagin et al. | |
| 2003/0037074 A1 * | 2/2003 | Dwork et al. | 707/500 |
| 2003/0046098 A1 | 3/2003 | Kim | |
| 2005/0004897 A1 * | 1/2005 | Lipson et al. | 707/3 |
| 2005/0222981 A1 * | 10/2005 | Lawrence et al. | 707/3 |
| 2006/0294068 A1 * | 12/2006 | Li et al. | 707/3 |
| 2007/0143273 A1 | 6/2007 | Knaus et al. | |
| 2007/0150473 A1 | 6/2007 | Li et al. | |
| 2007/0174872 A1 | 7/2007 | Jing et al. | |
| 2007/0276812 A1 | 11/2007 | Rosen | |

OTHER PUBLICATIONS

Nir Ailon, "Aggregation of Partial Rankings, P-Rating and Top-m Lists", Institue for Advanced Study, Princeton NJ.*
Cynthia Dwork et al., "rank Aggregation Revisited", Compaq System Research center, 130 Lytton ava, Palo Alto, CA 94301.*
Metzler et al., "Direct Maximization of Rank-Based Metrics for Information Retrieval", 2005, 8 pages.
Klementiev et al., "An Unsupervised Learning Algorithm for Rank Aggregation", ECML 2007, 8 pages.
Adali et al., "The Impact of Ranker Quality on Rank Aggregation Algorithms:Information vs. Robustness", Proceedings of the 22nd International Conference on Data Engineering Workshops (ICDEW'06) 0-7695-2571-7/06 2006 IEEE, 10 pages.

(Continued)

*Primary Examiner*—Hung T Vy

(57) ABSTRACT

Described herein is a system that includes a receiver component that receives first scores for training points and second scores for the training points, wherein the first scores are individually assigned to the training points by a first ranker component and the second scores are individually assigned to the training points by a second ranker component. The apparatus further includes a determiner component in communication with the receiver component that automatically outputs a value for a parameter $\alpha$ based at least in part upon the first scores and the second scores, wherein $\alpha$ is used to linearly combine the first ranker component and the second ranker component.

18 Claims, 11 Drawing Sheets

OTHER PUBLICATIONS

Fernández et al., "Probabilistic Score Normalization for Rank Aggregation", Apr. 2006, 4 pages.

Burges, et al., "Learning to Rank using Gradient Descent", ICML, 89-96, 2005.

Burges, et al., "Learning to Rank with Nonsmooth Cost Functions", NIPS, 193-200, 2007.

Freund, et al., "An Efficient Boosting Algorithm for Combining Preferences", Journal of Machine Learning Research, 4:933-969, 2003.

Friedman, et al., "Additive logistic regression: a statistical view of boosting", The Annals of Statistics, 28(2):337-407, 2000.

Friedman, "Greedy function approximation: A gradient boosting machine", The Annals of Statistics, 29(5):1189-1232, 2001.

Jarvelin, et al., "IR evaluation methods for retrieving highly relevant documents", SIGIR, 41-48, 2000.

Kleinberg, "Authoritative sources in a hyperlinked environment", SODA, 668-677, 1998.

* cited by examiner

LINEAR COMBINATION OF RANKERS

BACKGROUND

Search engines typically output search items in a ranked manner, where a search item that is determined to be highly relevant to an input query and/or user is displayed relatively high on a list of search items when compared to a search item that is determined to be less relevant to the query and/or user. Properly ranking search items is an important task, as a typical user is not willing to sift through several pages of search items, but instead only reviews a first, relatively small number of search items. Thus, often a user will assume that a small subset of search items shown on a first page is most relevant to the user and query, when, in actuality, the user may have found a search item on a subsequent page that is most relevant to the user and query.

Ranking of search items is performed by ranking algorithms (rankers), which assign scores to search items that are located in response to a query. A higher score correlates to a higher position on a list of search items provided to a user in response to the query. Information retrieval metric methods are used to determine the quality of a ranking generated by a ranker. More specifically, in order to evaluate the quality of a ranker, that ranker is provided with labeled data (e.g., the relevance of search results to a query is known a priori) and outputs an ordered list of search items. An information retrieval metric method is then used to determine a quality of the rankers based upon the ordered list of search items. Furthermore, it has been determined that rankers may, in some instances, be combined and may provide better ranking scores when combined as compared to ranking scores output by the rankers individually. Determining how to combine rankers in a way that is optimal or near optimal for an information retrieval metric method or methods, however, is non-trivial.

SUMMARY

The following is a brief summary of subject matter that is described in greater detail herein. This summary is not intended to be limiting as to the scope of the claims.

Various technologies relating to linearly combining ranker components are described in detail herein. In an example, a first ranker component and a second ranker component each assign scores to labeled training items (training points) that correspond to a query and/or data related to the query. In other words, a desired ranking of the training points with respect to the query is known a priori. A score assigned to a training point is indicative of the relevance of the training point to the query as determined by a ranker component. The two different ranker components may assign different scores to the same training point, which may result in a set of training points being ordered differently depending on which ranker component assigned the scores with respect to the set of training points. The scores assigned to the training points by the first and second ranker components can be analyzed, and the ranker components can be linearly combined based at least in part upon the analysis. In addition, the linear combination of the ranker components may be optimized with respect to an information retrieval metric method.

In an example, to determine the aforementioned linear combination, scores from the first ranker component may be linearly combined with scores from the second ranker component. For instance, a training point may be assigned a score $S_1$ by the first ranker component and a score $S_2$ by the second ranker component. The scores can be linearly combined, for example, as $S = (1-\alpha)S_1 + \alpha S_2$, where $S$ represents the linear combination of $S_1$ and $S_2$, and $\alpha$ is assigned a value between zero and one. Accordingly, as $\alpha$ sweeps from zero to one, $S$ sweeps from $S_1$ to $S_2$. This can be undertaken for all search results. For example, $S_{ab}$ can denote a score that a ranker component a assigns to training point b, where a may be one of two values, which for purposes of explanation can be 1 (denoting the first ranker component) or 2 (denoting the second ranker component). Then for any pair of training points denoted as b and c, the scores that the first ranker components assigns these training points are $S_{1b}$ and $S_{1c}$, and the scores that the second ranker assigns these training points are $S_{2b}$ and $S_{2c}$. In this example, then, every pair of training points falls into one of two classes: those for which there exists a value of $\alpha$ in the interval $[0,1]$ for which $(1-\alpha)S_{1b} + \alpha S_{2b} = (1-\alpha)S_{2b} + \alpha S_{2a}$, and those for which there does not exist such a value of $\alpha$. The first class of pairs will be denoted "crossing pairs", and the second, "non-crossing pairs." Since information retrieval metrics output by information retrieval metric methods generally depend only upon the sorted order of the items, the values that a given such metric takes when combining two rankers linearly as described above, for all possible linear combinations formed using the unit interval $[0,1]$, may be efficiently enumerated by examining only those cases where a value of $\alpha$ exists for which the two items in a crossing pair take the same combined score, since at that point, as $\alpha$ sweeps from 0 to 1, those two items cross in their ordering shown to the user.

Other aspects of the present application will be appreciated upon reading and understanding the attached figures and description.

DETAILED DESCRIPTION

Figure 1:
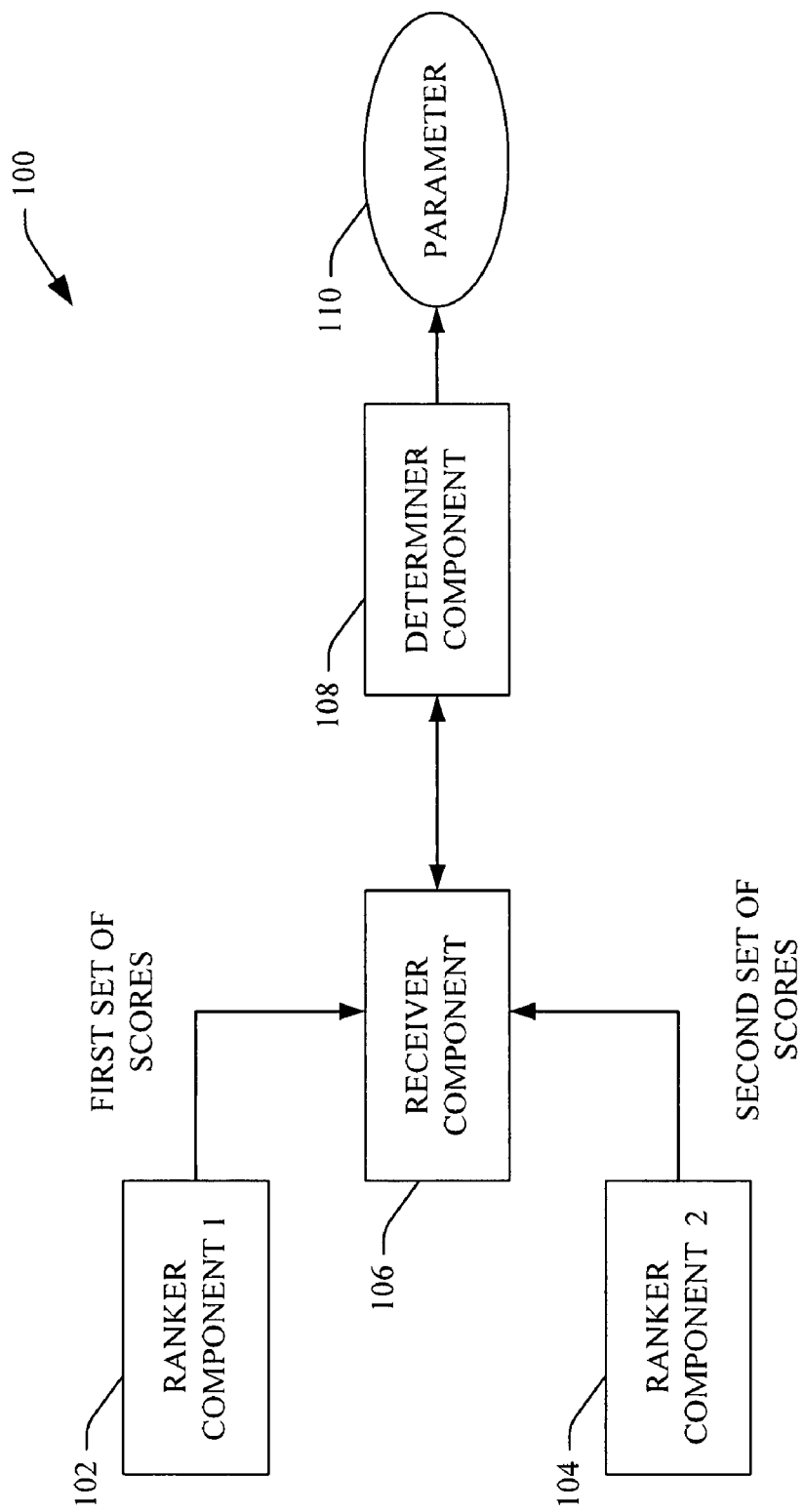
FIG. 1 is a functional block diagram of an example system that facilitates linearly combining two or more ranker components.

Various technologies pertaining to information retrieval will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple threads of execution. Similarly, for instance, a single thread of execution may be configured to perform functionality that is described as being carried out by multiple components.

With reference to FIG. 1, an example system 100 that facilitates determining the value of a parameter used when linearly combining multiple ranker components is illustrated. The system 100 includes a first ranker component 102 and a second ranker component 104. A receiver component 106 receives first scores from the first ranker component 102 and second scores from the second ranker component 104. The first ranker component 102 and the second ranker component 104 are non-identical, and thus the first scores output by the first ranker component 102 may differ from the second scores output by the second ranker component 104. The first scores and the second scores are scores individually assigned to training points that correspond to a query (and/or data related to the query) by the first and second ranker components 102 and 104, respectively. In other words, each training point that corresponds to the query (and/or data related to the query) is assigned a score by the first ranker component 102 and the second ranker component 104. A determiner component 108 analyzes the first and second scores and automatically outputs a parameter 110 used to linearly combine the first ranker component 102 and the second ranker component 104. Linearly combining the first and second ranker components 102 and 104 can be defined as linearly combining scores output by the first and second ranker components 102 and 104. The parameter 110 is based at least in part upon the scores assigned by the first ranker component 102 and the second ranker component 104 to the training points.

The first ranker component 102 and the second ranker component 104 can receive data that identifies training points that correspond to a query and/or data related to the query. The training points may include labeled data, including labeled uniform resource locators (URLs), labeled files, and/or the like. Each training point is labeled such that a desired order of the training point is known with respect to a query and/or data related to the query. As used herein, a file is intended to encompass a document, an image, a video, and/or other suitable data structures.

The first ranker component 102 individually assigns a score to each training point that corresponds to the aforementioned query and/or data related to the query. Similarly, the second ranker component 104 individually assigns a score to each training point that corresponds to the query and/or data related to the query. The scores assigned to the training points are indicative of relevance of each training point with respect to the query and/or data related to the query. For instance, a relatively high score may indicate that a ranker component outputting the score determines that the training point has high relevance to the query and/or data related to the query. As the first ranker component 102 and the second ranker component 104 are non-identical, the first ranker component 102 may assign a different score to a training point when compared with a score assigned to the same training point by the second ranker component 104 with respect to a same query. In addition, because the first ranker component 102 and the second ranker component 104 may assign different scores to a same training point, rank of the training points may differ depending on the ranking component that assigns the scores to the training points. In a detailed example, the first ranker component 102 may assign a score to a training point that causes the training point to be a most relevant item among all training points while the second ranker component 104 may assign a score to the same training point that causes the training point to be a fourth most relevant item among all training points.

Data that identifies the training points and scores assigned to each training point (that correspond to the query and/or data related to the query) by the first ranker component 102 and the second ranker component 104 are received by the determiner component 108, which determines the value of a parameter ($\alpha$) based at least in part upon the training points and the corresponding scores. The determined value of $\alpha$ is used to linearly combine the first ranker component 102 and the second ranker component 104. For instance, the value of $\alpha$ may be selected to cause the linear combination of the first ranker component 102 and the second ranker component 104 to be optimal or substantially optimal with respect to a selected information retrieval metric method, such as Normalized Discounted Cumulative Gain (NDCG), Mean Average Precision (MAP), Mean Reciprocal Rank, Bpref, Q-measure, generalized average precision, amongst others.

In an example, the first ranker component 102 and the second ranker component 104 may be linearly combined by modifying scores for training points output by one or both of the first ranker component 102 and the second ranker component 104 by a function of $\alpha$ and combing the resultant scores. For instance, the following algorithm represents one example manner that the first ranker component 102 and the second ranker component 104 may be linearly combined:

$$S=(1-\alpha)S_1+\alpha S_2; \quad (1)$$

where $S_1$ is a score output by the first ranker component 102 for a training point with respect to the query and/or data related to the query, $S_2$ is a score output by the second ranker component 104 for the training point with respect to the query and/or data related to the query, and S is the linearly combined score for the first and second ranker components 102 and 104 with respect to the query and/or data related to the query. In this example, $\alpha$ may have a value between zero and one. In another example, the first ranker component 102 and the second ranker component 104 may be linearly combined as follows:

$$S=S_1+\alpha S_2; \quad (2)$$

where $\alpha$ can be any suitable value. Other manners of linearly combining the first ranker component 102 and the second ranker component 104 are contemplated and intended to fall under the scope of the hereto-appended claims. A manner in which $\alpha$ is selected is described in detail below.

Figure 2:
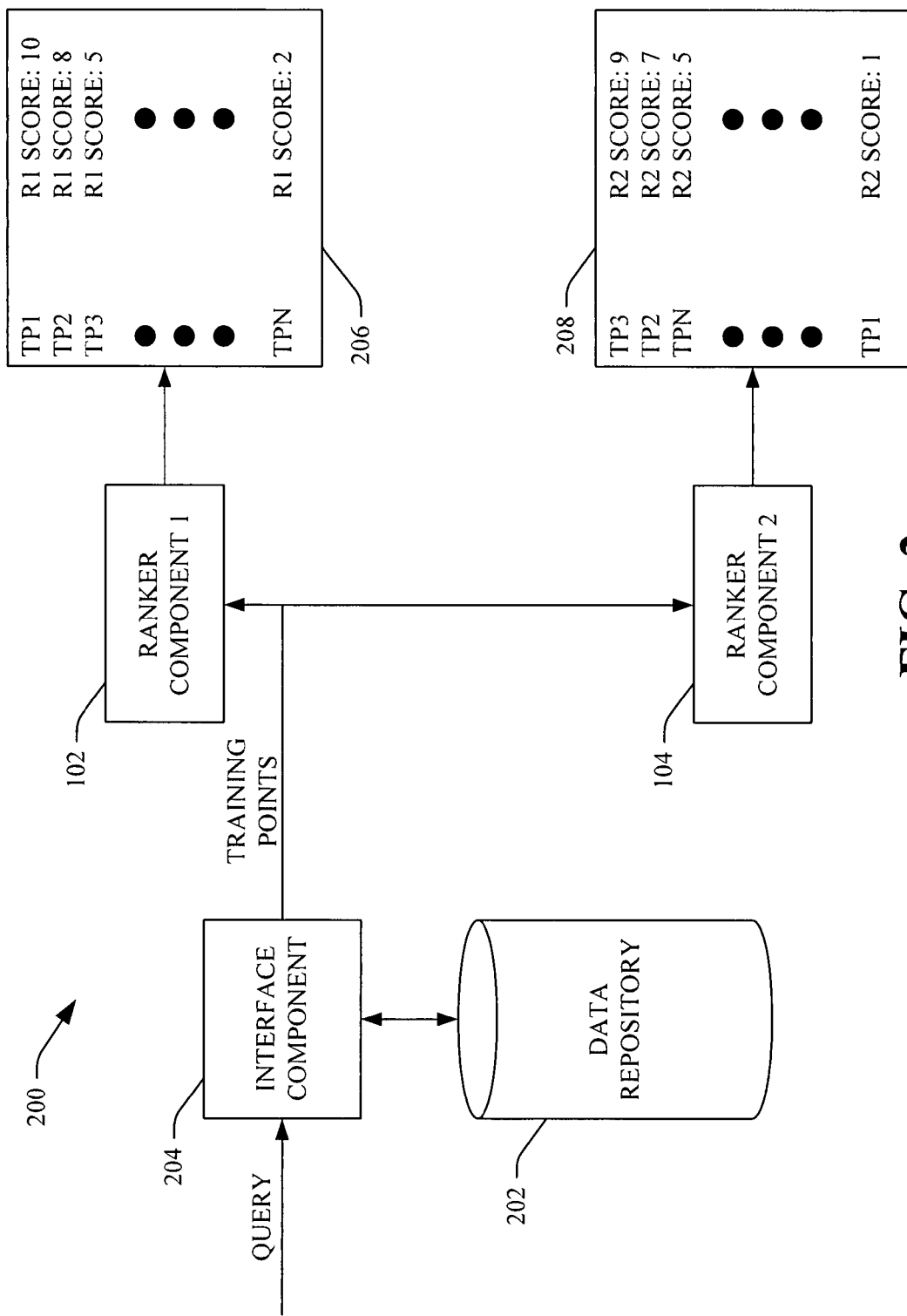
FIG. 2 is a functional block diagram of an example system that facilitates assigning scores to training points.

With reference to FIG. 2, an example system 200 that illustrates the assignment of scores to training points is provided. The system 200 includes a data repository 202 that includes training data 204, wherein the training data includes training points. As noted above, training points are labeled items, where a desired order of rank of the training points is known with respect to a query (and/or data relating to the query). An interface component 204 receives a query and locates training points in the training data 204 that correspond to the query and/or data relating to the query. The first ranker component 102 and the second ranker component 104 receive data that identifies the training points located by the interface component 204 with respect to the query and/or data related to the query.

The first ranker component 102 assigns scores to each training point identified by the interface component 204 with respect to the query and/or data related to the query. For example, the first ranker component 102 can output a data structure 206 that includes data indicative of identities of each training point and scores assigned to each training point by the first ranker component 102. Similarly, the second ranker component 104 may output a data structure 208 that includes data indicative of identities of each training point and scores assigned to each training point by the second ranker component 104. As can be determined by reviewing the example data structures 206 and 208, scores assigned to training points may differ between ranking components, and thus the ranking of training points may differ between ranking components.

Figure 3:
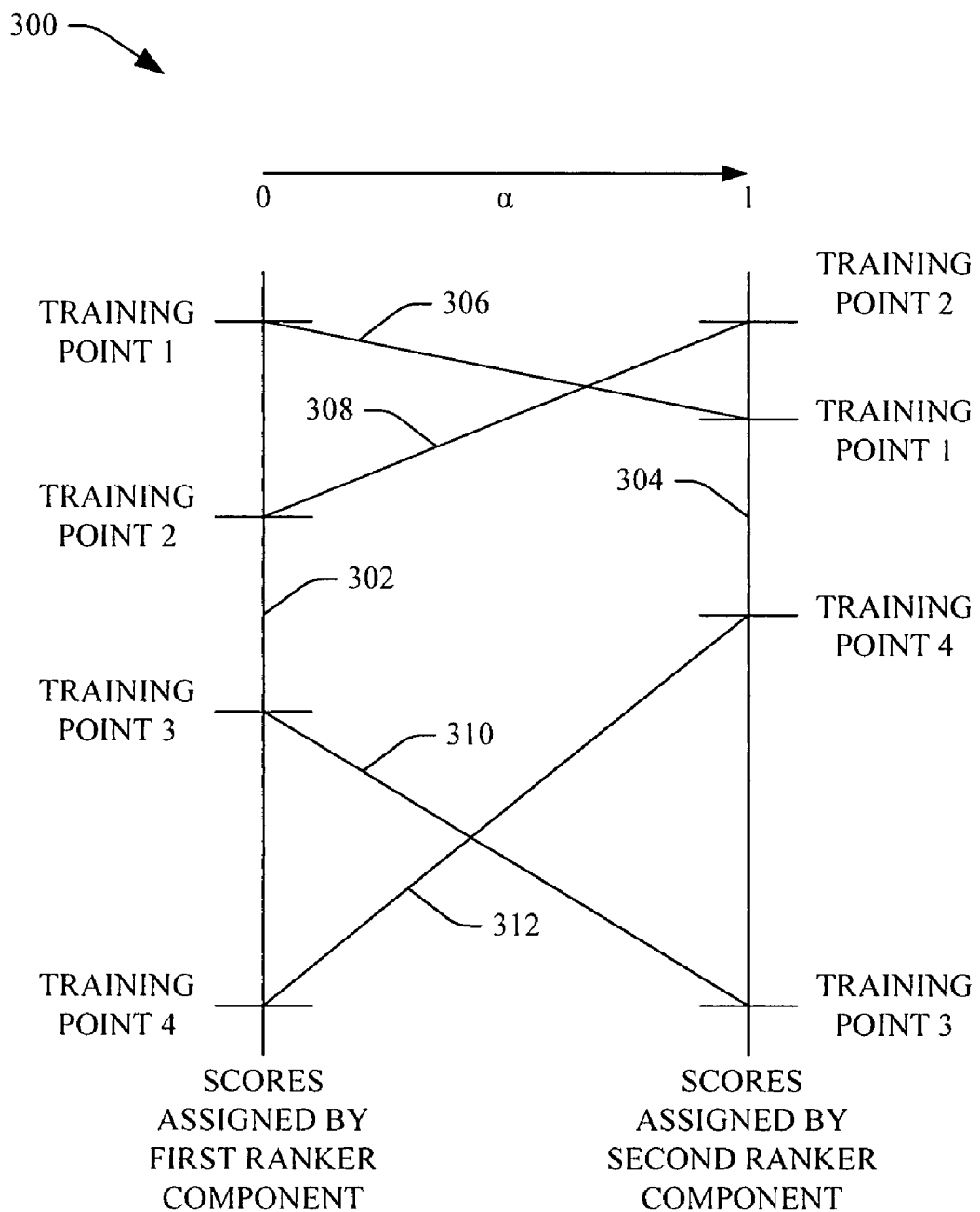
FIG. 3 is an example illustration of scores assigned to training points by two ranker components.

Now referring to FIG. 3, an example illustration 300 that graphically depicts scores assigned to training points by the first ranker component 102 and the second ranker component 104 is provided. The illustration 300 includes a first vertical line 302 that represents scores that may be assigned to training points by the first ranker component 102 with respect to a query and/or data related to the query. The illustration 300 additionally includes a second vertical line 304 that represents scores that may be assigned to training points by the second ranker component 104 with respect to the query and/or data related to the query.

In this example illustration 300, the first ranker component 102 has assigned a first training point a highest score, a second training point a second highest score, a third training point a third highest score, and a fourth training point a fourth highest score. The second ranker component 104 has assigned the second training point the first highest score, the first training point the second highest score, the fourth training point the third highest score, and the third training point the fourth highest score.

To determine a value for $\alpha$ that causes the linear combination of the first ranker component 102 and the second ranker component 104 to be optimized or substantially optimized for a given information retrieval metric method, values for $\alpha$ can be ascertained that cause a pair of training points to be scored equally when the first and second ranker components 102 and 104 are linearly combined. This is graphically depicted as being the locations where lines corresponding to training points intersect. For instance, if a linear combination of the first ranker component 102 and the second ranker component 104 is achieved through algorithm (1), then the vertical line 302 corresponds to where $\alpha$ is equal to zero and the vertical line 304 corresponds to where $\alpha$ is equal to one. A line 306 indicates how the score for the first training point changes as a value of $\alpha$ increases, a line 308 indicates how the score for the training point changes as a value of $\alpha$ increases, a line 310 indicates how the score for the third training point changes as a value of $\alpha$ increases, and a line 312 indicates how the score for the fourth training point changes as $\alpha$ increases. With respect to the example illustration 300, then, it is desirable to determine where the lines 306 and 308 intersect and where the lines 310 and 312 intersect. As noted above, however, every value of $\alpha$ can be determined that cause a pair of search results to have an equal score when the first ranker component 102 and the second ranker component 104 are linearly combined.

These values of $\alpha$ can then be used to determine a value for $\alpha$ that results in an optimal or substantially optimal linear combination of the first ranker component 102 and the second ranker component 104 with respect to a given information retrieval metric method. In more detail, an information retrieval metric method may be used to determine a quality metric for the linear combination of the first ranker component 102 and the second ranker component 104 when the value of $\alpha$ is zero. The quality metric may be discerned through use of any suitable method. A value of $\alpha$ may then be selected that is illustrated graphically as being between the intersection of lines 310 and 312 and the intersection of lines 306 and 308. A change in the quality metric (or a new quality metric) may be determined by using this value of $\alpha$ to linearly combine the first ranker component 102 and the second ranker component 104. In an example, a value for $\alpha$ can be chosen as a midpoint between the intersection of lines 310 and 312 and the intersection of lines 306 and 308. It is to be understood, however, that any suitable value of $\alpha$ between the two aforementioned intersections can be selected and used to linearly combine the first ranker component 102 and the second ranker component 104.

Thereafter, a value of $\alpha$ can be selected that is illustrated graphically as being larger than the value of $\alpha$ at the intersection of lines 306 and 308, and a change in the quality metric (or a new quality metric) can be computed using this value of $\alpha$ to linearly combine the first ranker component 102 and the second ranker component 104. The value of $\alpha$ that corresponds to where the quality metric is determined to be optimal or substantially optimal may then be selected for use when linearly combining the first ranker component 102 and the second ranker component 104. While the analysis has been described with respect to values of $\alpha$ moving from a lower value to a relatively higher value (e.g., 0 to 1), it is understood that the analysis can be undertaken in the reverse. That is, the analysis can begin with a relatively higher value for $\alpha$ and proceed towards a relatively lower value for $\alpha$.

The example illustrated in FIG. 3 and described above relates to a case where two ranker components are linearly combined with respect to a single query and/or data related thereto. It can be discerned, however, that multiple sets of training points corresponding to multiple queries (and/or data related to the multiple queries) can be used to determine a value for $\alpha$ to be used to linearly combine the first ranker component 102 and the second ranker component 104. With respect to the graphical depiction of FIG. 3, for example, this can be done by computing all values of $\alpha$ for which any pair of lines cross, for all such diagrams, and then examining the so-enumerated values of $\alpha$ in order to determine all possible values that an information retrieval quality metric can take, for any such linear combination of rankers. The values of $\alpha$ for which a given pair of lines cross can be computed analytically, given the start and end points of the two corresponding lines.

In addition, three or more ranker components may be linearly combined by, for instance, determining a value for $\alpha$ that corresponds to the optimal or substantially optimal linear combination of each pair of ranker modules and converging the determined values of $\alpha$ for each pair of ranker modules. This could, for example, be accomplished as follows: if three rankers are desirably combined, the above described procedure can be applied to find a linear combination of the first and second ranker components 102 and 104. The resulting, linearly combined ranker can be denoted $R_{12}$. The above procedure can then be used to linearly combine $R_{12}$ with a third ranker component $R_3$. Furthermore, the third ranker component can be linearly combined (optimally or substantially optimally with respect to a selected information retrieval metric method) with the first ranker component 102, wherein the combination can be denoted as $R_{13}$. The above procedure can be used to linearly combine $R_{13}$ with the second ranker component 104. By iterating this procedure, a weight $\alpha_i$ can be found for each individual ranker component, so that the optimal or substantially optimal linear combination of the three ranker components is $\alpha_1 S_1 + \alpha_2 S_2 + \alpha_3 S_3$, where $S_i$ denotes the score (for any given item) output by the ith ranker component. Other manners for linearly combining three or more ranker components are also contemplated and intended to fall under the scope of the hereto-appended claims.

Furthermore, an instance may arise where, when the first and second ranker components 102 and 104 are linearly combined, a value of α causes three or more training points to be scored equally when the first and second ranker components 102 and 104 are linearly combined. Depicted graphically, three or more lines corresponding to three or more search results may intersect at a same point. If this circumstance occurs, scores corresponding to the training points may be slightly modified, thereby causing a value of α to only cause a pair of training points to be scored equally when the first and second ranker component 102 and 104 are linearly combined. In another example, values of α that cause three or more training points to be scored equally when the first and second ranker components 102 and 104 are linearly combined can be identified. Thereafter, every possible different ranking with respect to the three or more training points can be analyzed and an information retrieval metric can be generated for the different possible rankings, where a ranking is an ordering of search results.

Figure 4:
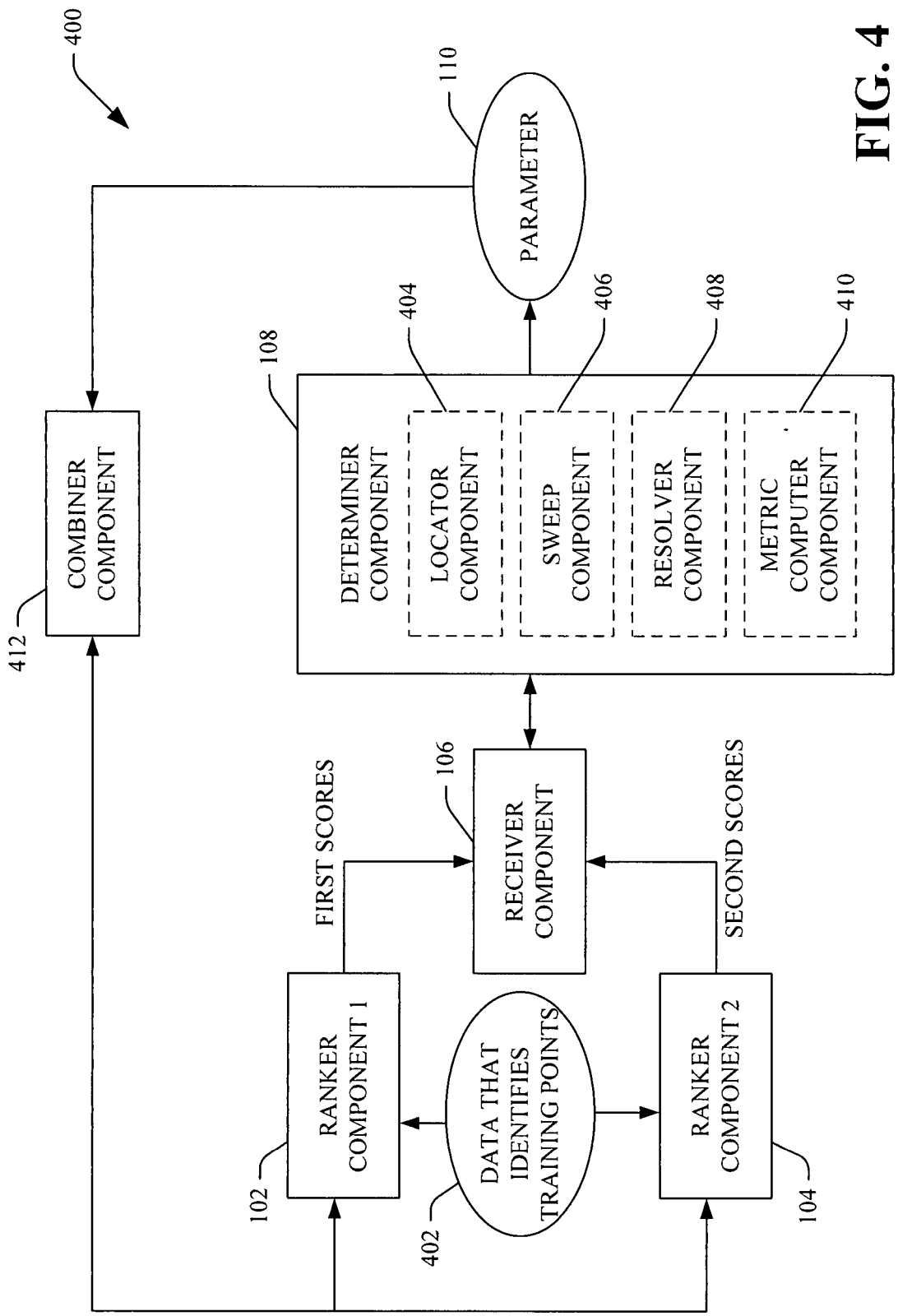
FIG. 4 is a functional block diagram of an example system that facilitates linearly combining two or more ranker components.

Now turning to FIG. 4, an example system 400 that facilitates linearly combining two ranker components is illustrated. The system 400 includes the first ranker component 102 and the second ranker component 104. The first and second ranker components 102 and 104 are configured to receive data that identifies training points 402 (and/or training points themselves) and provide scores that correspond to each training point. The receiver component 106 receives first scores for training points and second scores for the training points from the first and second ranker components 102 and 104, respectively.

The determiner component 108 receives the scores from the receiver component 106. The determiner component 108 includes a locator component 404, which determines values of α that correspond to where scores assigned to different training points are equal when the first and second ranker components 102 and 104 are linearly combined. The locator component 404 can determine these values of α for a plurality of different pairs of training points and a plurality of queries (or data related to queries) that correspond to the training points.

The determiner component 108 additionally includes a sweep component 406 that selects values of α to use to linearly combine the first ranker component 102 and the second ranker component 104. In an example, the sweep component 406 may select values of α in an increasing order, such that a first value of α is selected that is below a lowest value of α determined by the locator component 404, a second value of α selected by the sweep component 406 is between the lowest value of α and the second lowest value of α determined by the locator component, etc. As described above, the analysis may also occur in the reverse. It is to be understood that any manner of selecting values for α that result in a different ranking of search results when the first ranker component 102 and the second ranker component 104 are linearly combined as a function of α is contemplated and intended to fall under the scope of the hereto-appended claims.

The determiner component 108 further includes a resolver component 408 that recognizes values of α that cause scores of three or more training points to be equal when the first and second ranker components 102 and 104 are linearly combined as a function of α. The resolver component 408 recognizes such instances and, for example, modifies the score assigned to at least one of the training points. This modification ensures that only two of the three training points will have equal scores for the recognized value of α.

The determiner component 108 also includes a metric computer component 410 that, for example, computes a qual-ity metric using any suitable information retrieval metric method. The quality metric computed by the metric computer component 410 uses α values that lie between consecutive α values located by the locator component 404. The α value that corresponds to the most desirable quality metric is chosen by the determiner component 108 as the α value to use when linearly combining the first and second ranking components 102 and 104. In another example, the metric computer component 410 can compute a difference in a quality metric from a previously computed quality metric. Similarly to what has been described above, the determiner component 108 may select the α to use when linearly combining the first ranker component 102 and the second ranker component 104 based upon the α associated with the highest quality metric. The determiner module 108 can output this value as the parameter 110.

The system 400 further includes a combiner component 412 that uses the parameter to linearly combine the first ranker component 102 and the second ranker component 104. More specifically, the combiner component 412 can generate code that modifies output scores of at least one of the first ranker component 102 and the second ranker component 104 in accordance with a value of α determined by the determiner component 108. For example, once the ranker components 102 and 104 are combined, the linearly combined ranker component may be deployed for use in a search engine. For instance, the search engine may be used to search for documents on the Internet, on a private network, or the hard drive of a personal computer. In another example, once the first and second ranker components 102 and 104 are combined, they may be further combined with one or more other ranker components (not shown).

Figure 5:
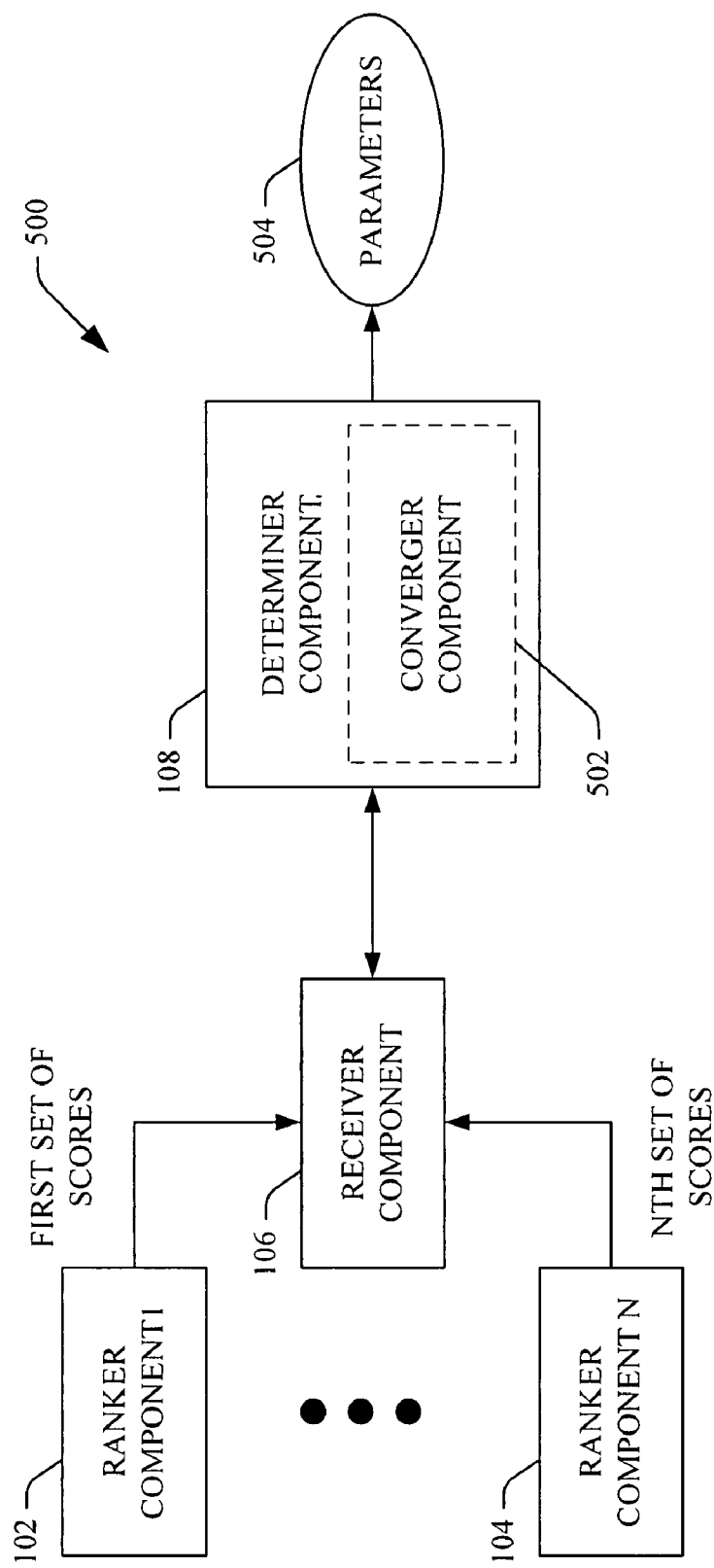
FIG. 5 is a functional block diagram of an example system that linearly combines three or more ranker components.

Now turning to FIG. 5, an example system 500 that facilitates linearly combining three or more ranker components is illustrated. The system 500 includes the first ranker component 102 and an Nth ranker component 502, wherein N is equal to or greater than three. Each of the N ranker components receives data that identifies training points corresponding to one or more queries (and/or one data related to the one or more queries) and assigns scores to each training point. As noted above, the scores assigned to the training points by each module correspond to a computed/estimated relevance of the training point to a query (and/or data related to the query). The system 500 also includes the receiver component 106 that receives data that can identify the training points and scores assigned to the training points from each of the ranker components.

The determiner component 108 receives the data that is indicative of the training points and the corresponding scores from the receiver component 106. The determiner component 108 can determine a value for α for each linear combination of two ranker components in the N ranker components, wherein the value for α corresponds to an optimal or substantially optimal linear combination of two ranker components with respect to a chosen information retrieval metric method. In addition, the determiner component 108 can determine a value for α for a combined ranker component (e.g., two ranker components that have been linearly combined) and another ranker component or combined ranker component. Thus, the determiner component 108 can determine values of α (parameters 504) that correspond to any suitable combination of ranker components, wherein the determined values of α corresponds to an optimal or substantially optimal linear combination of two ranker components.

The determiner component 108 includes a converger component 504 that converges values of α determined by the determiner component 108 to ascertain a) which ranker components to include in a combination of ranker components, such that the combination is associated with a quality metric that is more desirable than quality metrics of other possible combinations; and b) values of α for a subset of ranker components that are to be included in the linear combination of ranker components. The converger component 504 can assign different values of α to different ranker components to create a linear combination of several ranker components. These values of α can be output by the determiner component 108 as the parameters 504.

Figure 6:
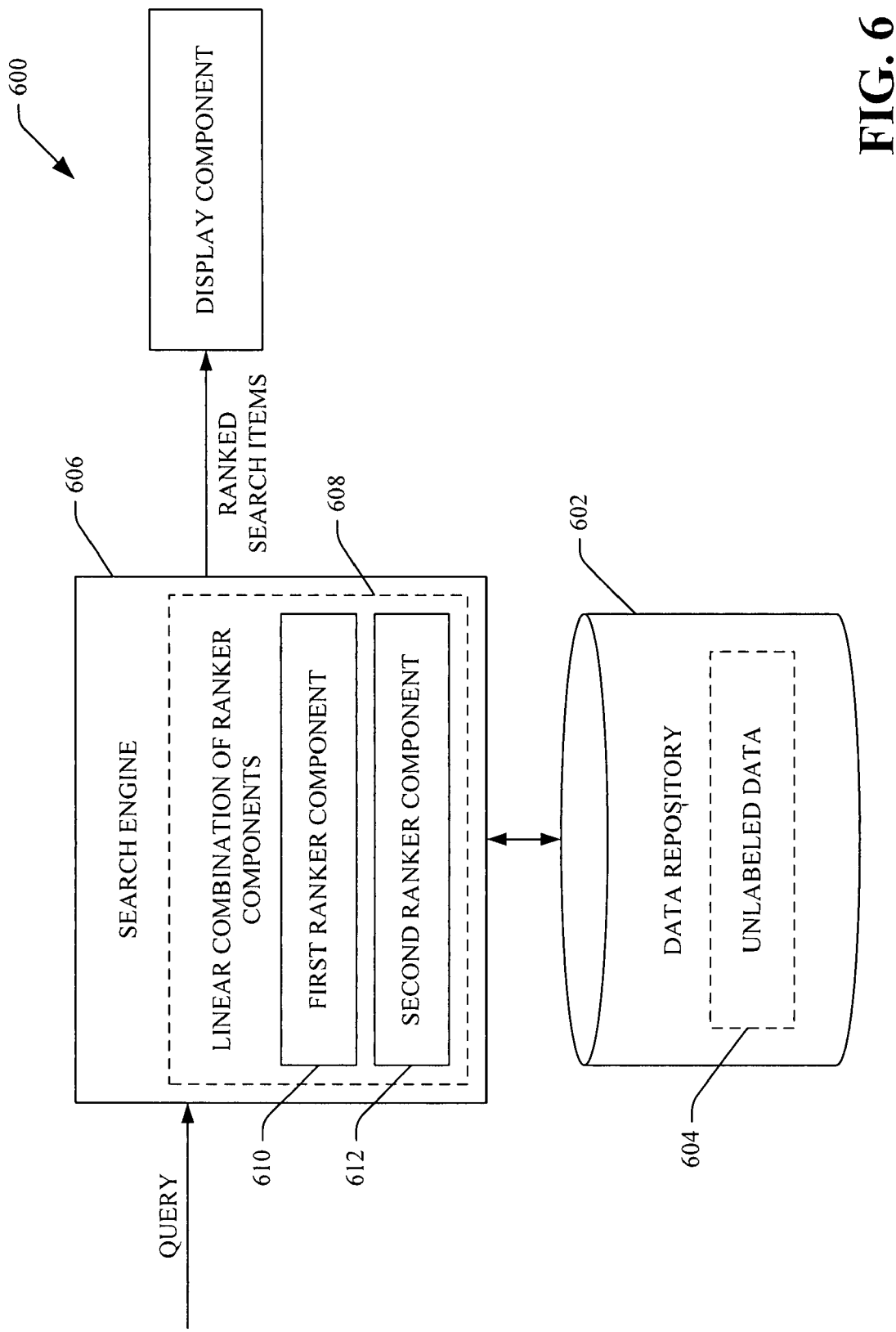
FIG. 6 is a functional block diagram of an example system that facilitates ranking items by way of a linear combination of ranker components.

Now referring to FIG. 6, an example system 600 that facilitates searching for items using a linear combination of ranker components is illustrated. The system 600 includes a data repository 602 that retains unlabeled data 604. For instance, the unlabeled data may include URLs, images, or files that may be accessible by way of the Internet. In another example, the unlabeled data 604 may include files resident upon a personal computer.

The system 600 additionally includes a search engine 606 that receives a query and searches the unlabeled data 604 in the data repository 602 in response to receipt of the query. The search engine 606 may search content of the data repository 602 based upon the query, a user that issues the query, contextual data, links and/or metadata associated with items in the data repository, etc. Additionally, the search engine 606 may locate items that are deemed to be relevant to the query, the user issuing the query, and/or data related thereto.

The search engine 606 includes a linear combination of ranker components 608, wherein the linear combination of ranker components 608 includes a first ranker component 610 and a second ranker component 612. The first ranker component 610 and the second ranker component 612 have been linearly combined by way of the components and/or procedures described herein. For example, the linear combination of ranker components 608 has been optimized or substantially optimized with respect to an information retrieval metric method. The first ranker component 610 and the second ranker component 612 individually assign scores to items located by the search engine 606. The scores (and thus the ranker components 610 and 612) are linearly combined as described above.

The system 600 further includes a display component 614 that facilitates displaying search results to a user that issued the query. Based at least in part upon the scores, the search engine outputs a ranked list of items to the user that issued the query and the display component 614 facilitates display of the ranked list to the user. For example, the display component 614 may reside on a server and format data for display on a client. In another example, the display component 614 can be or reside on a client. For instance, the display component 614 may be a display screen, a graphics card, or the like. In yet another example, the display component 614 may be a thread of execution on a client that facilitates displaying ranked search results to the user.

With reference now to FIGS. 7-10, various example methodologies are illustrated and described. While the methodologies are described as being a series of acts that are performed in a sequence, it is to be understood that the methodologies are not limited by the order of the acts in the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, the methodologies described herein may be utilized to generate a linear combination of rankers, wherein the linear combination of rankers is used in a search engine.

Figure 7:
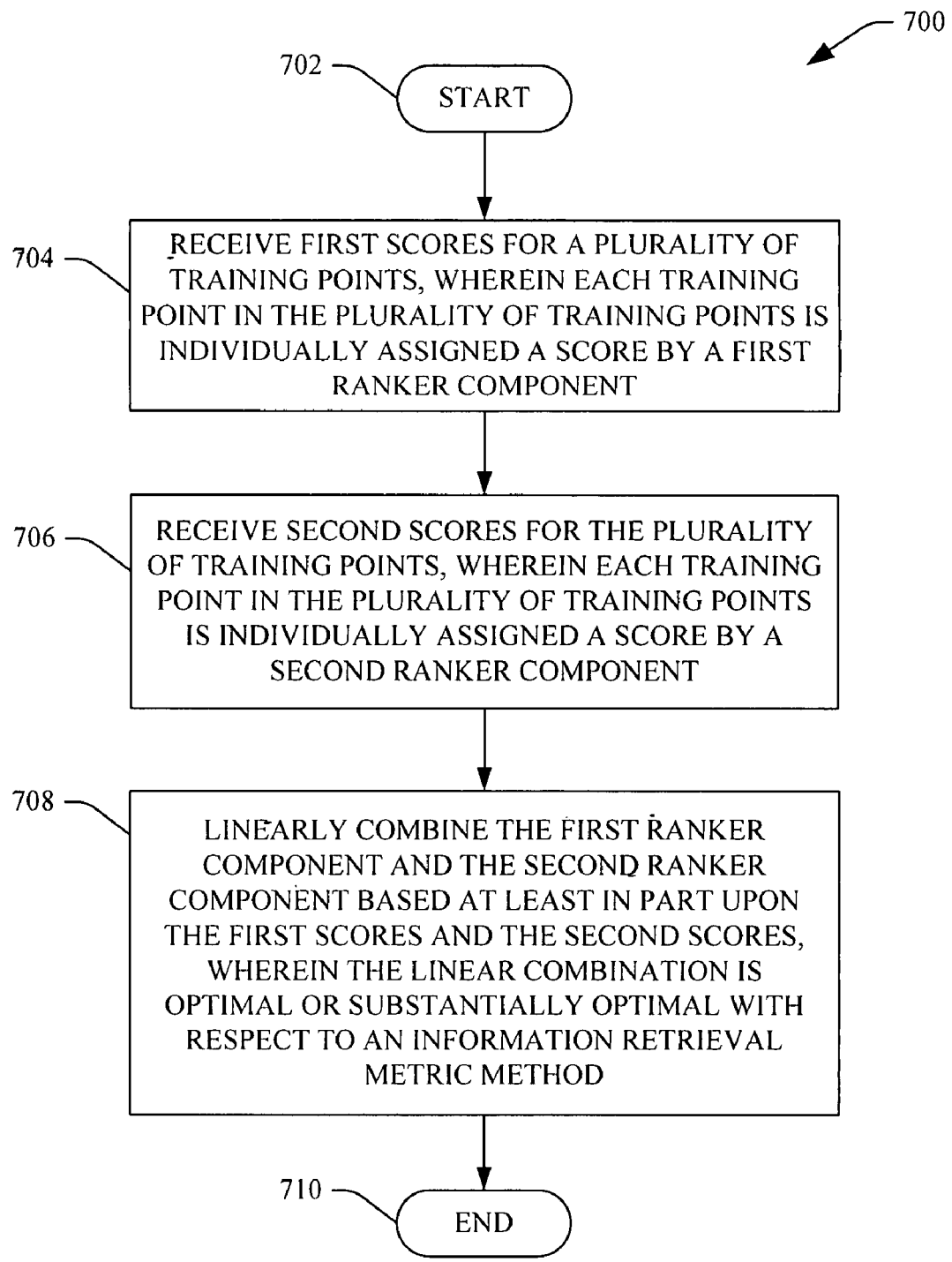
FIG. 7 is a flow diagram that illustrates an example methodology for linearly combining two or more ranker components.

Referring specifically to FIG. 7, an example methodology 700 for linearly combining two or more ranking components is illustrated. The methodology 700 starts at 702, and at 704 first scores for a plurality of training points are received. Each training point in the plurality of training points is individually assigned a score by a first ranker component.

At 706, second scores for the plurality of training points are received, wherein each training point in the plurality of training points is individually assigned a score by a second ranker component.

At 708, the first ranker component and the second ranker component are linearly combined based at least in part upon the first scores and the second scores, wherein the linear combination is optimal or substantially optimal with respect to an information retrieval metric method. The methodology 700 then completes at 710.

Figure 8:
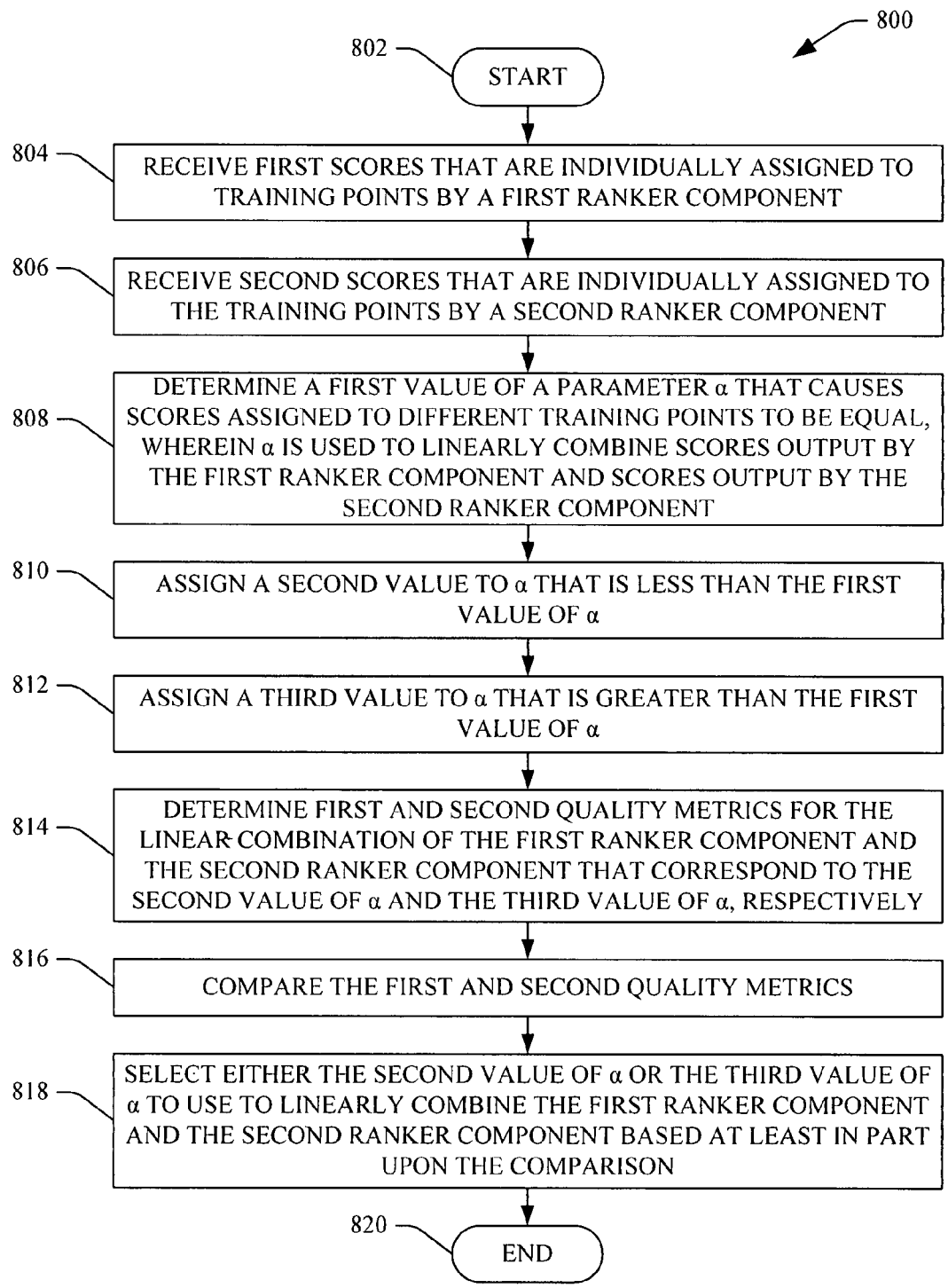
FIG. 8 is a flow diagram that illustrates an example methodology for linearly combining two or more ranker components.

Referring now to FIG. 8, an example methodology 800 for linearly combining at least two ranker components is illustrated. The methodology 800 starts at 802, and at 804 first scores that are individually assigned to training points by a first ranker component are received. At 806, second scores that are individually assigned to the training points by a second ranker component are received.

At 808, a first value of a parameter α that causes scores assigned to different training points to be equal is determined, wherein α is used to linearly combine the first ranker component and the second ranker component.

At 810, a second value is assigned to α that is less than the first value of α. At 812, a third value is assigned to α that is greater than the first value of α. At 814, first and second quality metrics for the linear combination of the first ranker component and the second ranker component are determined, wherein the first and second quality metrics correspond to the second and third values of α, respectively.

At 816, the first and second quality metrics are compared, and at 818 either the second value of α or the third value of α is selected to linearly combine the first ranker component and the second ranker component, wherein the selection is based at least in part upon the comparison of 816. The methodology 800 then completes at 820.

Figure 9:
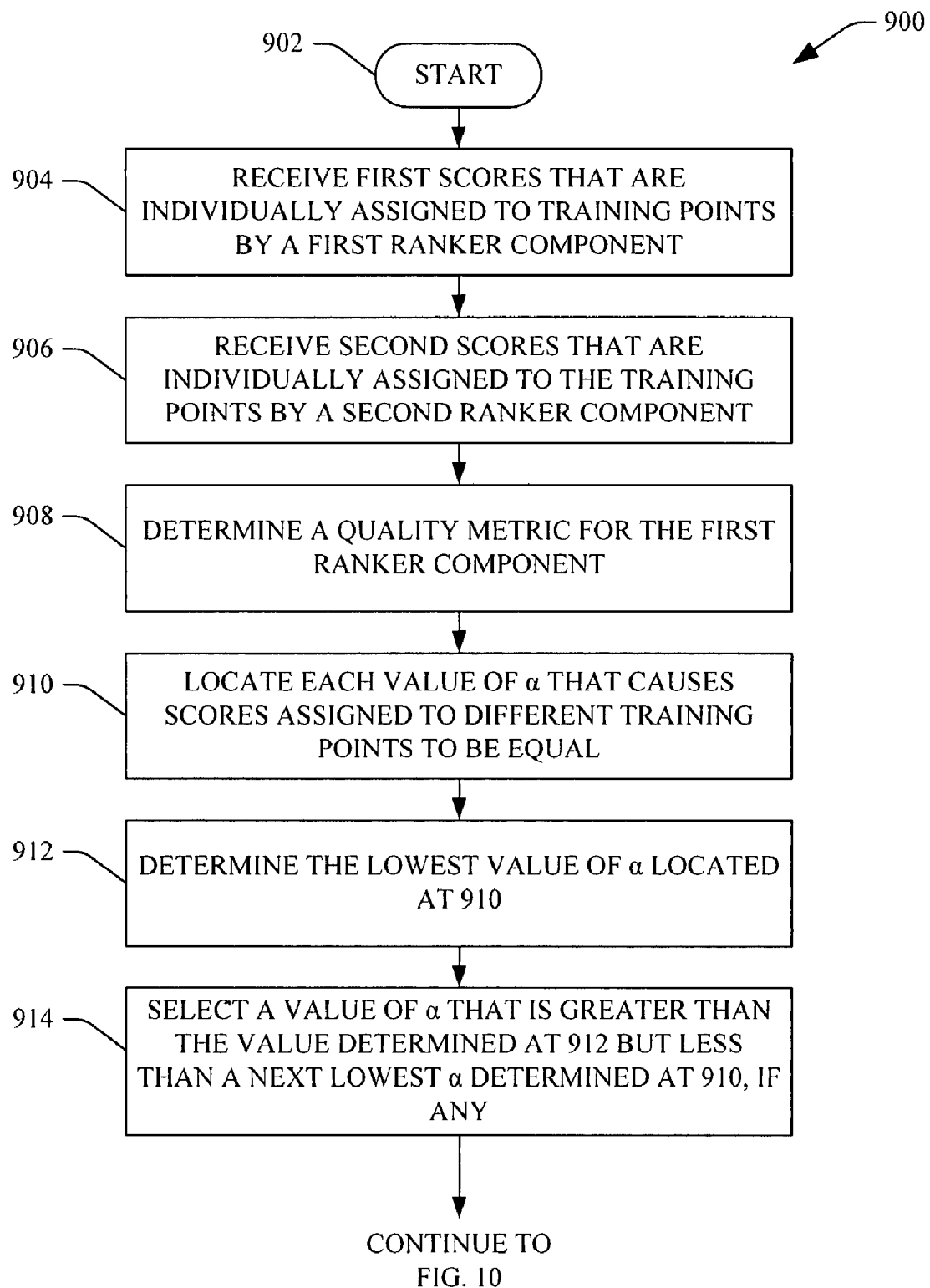
FIGS. 9-10 illustrate a flow diagram that illustrates an example methodology for combining two or more ranker components.
Figure 10:
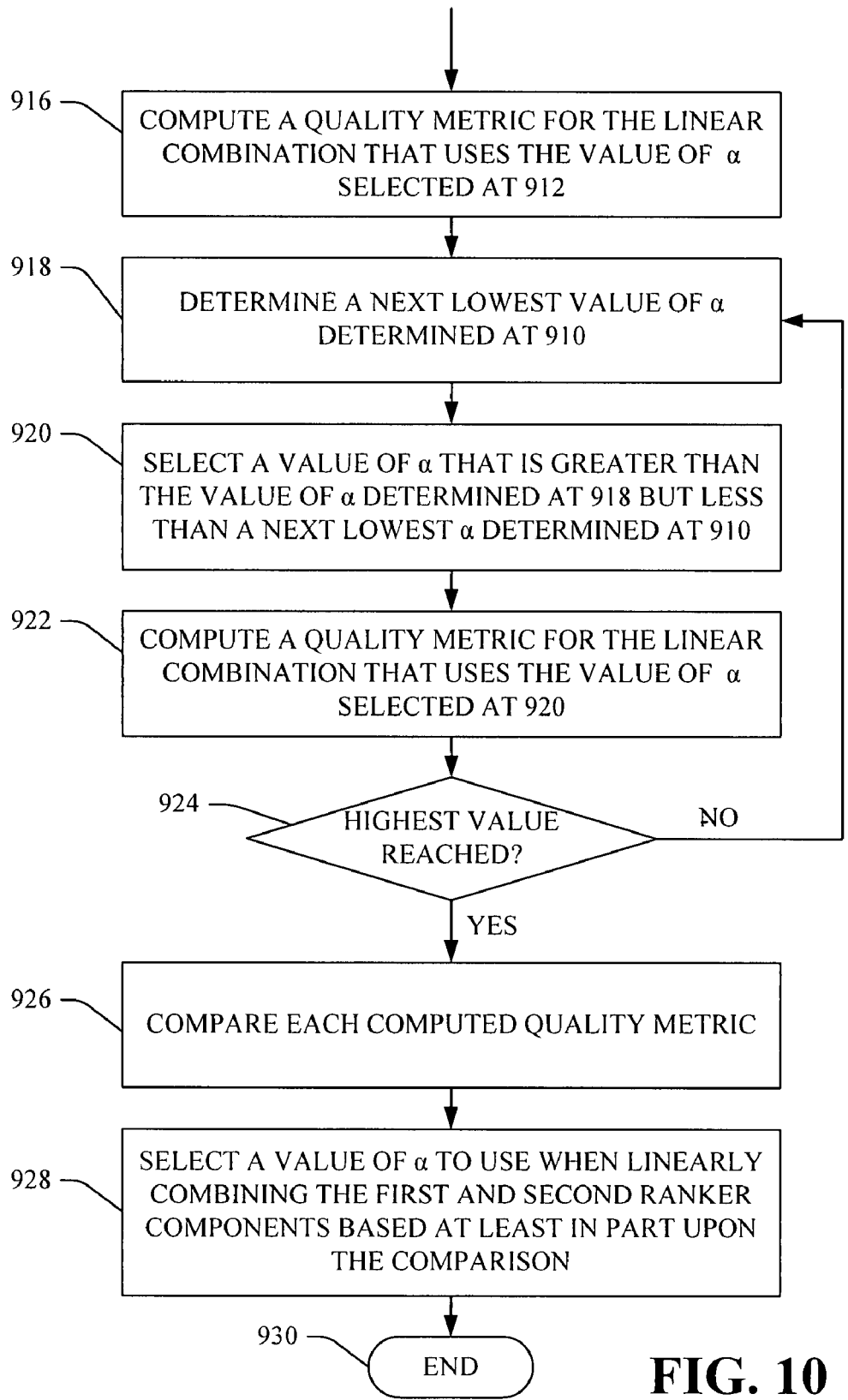

Now referring collectively to FIGS. 9 and 10, an example methodology 900 for linearly combining two or more ranker components is illustrated. The methodology 900 starts at 902, and at 904 first scores are received for training points that correspond to a query and/or data related to the query, wherein the first scores are individually assigned to the training points by a first ranker component. At 906, second scores are received for the set training points that correspond to the query and/or data related to the query, wherein the second scores are individually assigned to the training points by a second ranker component.

At 908, a quality metric is determined for the first ranker component. Any suitable information retrieval metric method may be used to compute the quality metric. At 910, each value of α is located that causes scores assigned to different training points to be equal (when the first and second ranker components are linearly combined).

At 912, the lowest value of α in the values of α located at 910 is determined. At 914, a value of α is selected that is greater than the value of α determined at 912 but is less than a next lowest value of α determined at 910 (if any).

At 916, a quality metric is computed for the linear combination of the first and second ranker components, wherein the linear combination uses the value of α selected at 912. At 918, a next lowest value of α that was determined at 910 is ascertained. At 920, a value of α is selected that is greater than the value of α determined at 918 but less than a next lowest value of α determined at 910. At 922, a quality metric is computed for the linear combination of the first ranker component and the second ranker component, wherein the linear combination uses the value of α selected at act 920.

At 924, a determination is made regarding whether a highest value of α determined at 910 has been reached. If a highest value of α determined at 910 has not been reached, the methodology 900 proceeds to 918. If a highest value of α determined at 910 has been reached, then at 926 each computed quality metric is compared. At 928, a value of α to use when linearly combining the first and second ranker components is selected, wherein the selection is based at least in part upon the comparison undertaken at 926. The method 900 then completes at 930.

Figure 11:
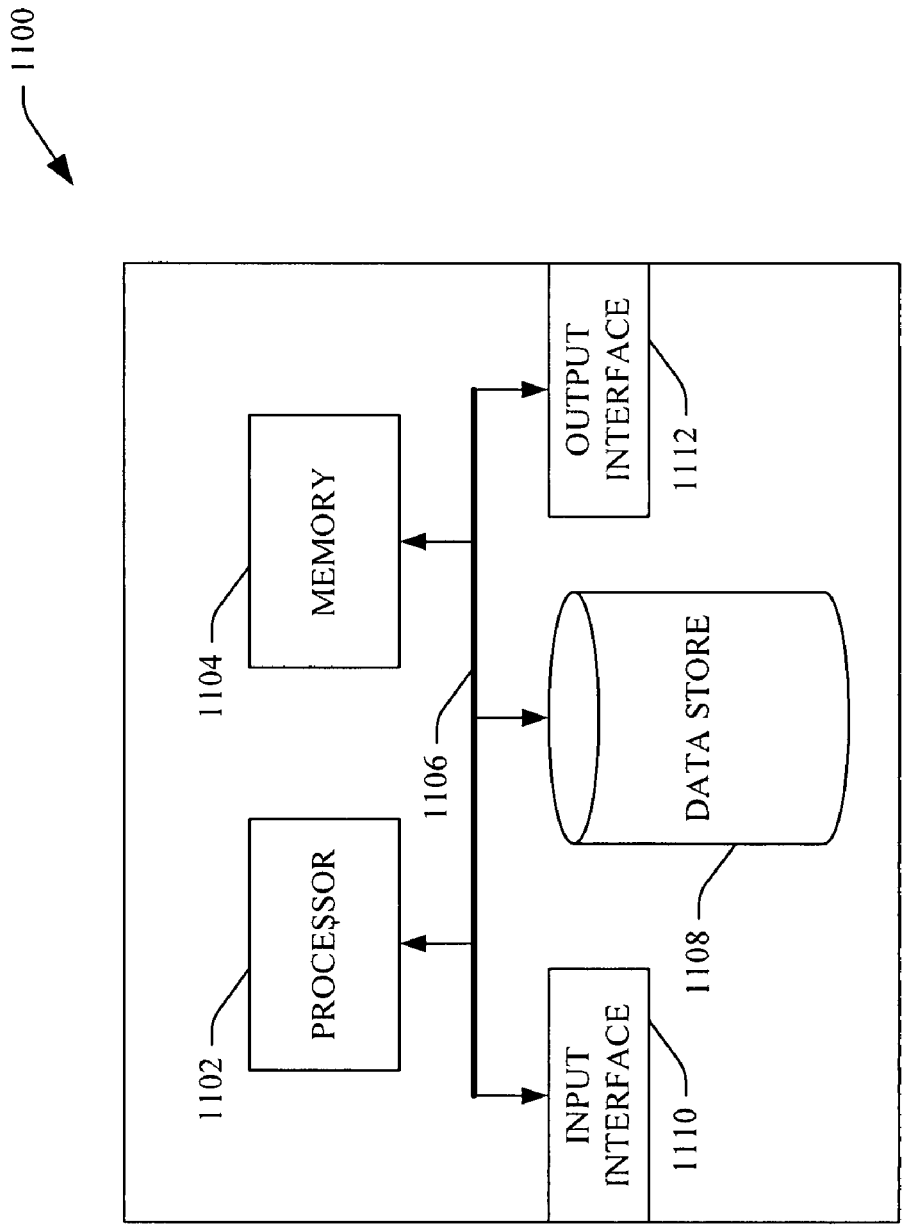
FIG. 11 is an example computing system.

Now referring to FIG. 11, a high-level illustration of an example computing device 1100 that can be used in accordance with the systems and methods disclosed herein is illustrated. For instance, the computing device 1100 may be used in an information retrieval context. The computing device 1100 can be used in a conventional server setting, or may be employed in devices that are conventionally thought of as client devices, such as personal computers, personal digital assistants, and the like. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory by way of a system bus 1106. In addition to storing executable instructions, the memory 1104 may also store identities of search results, scores associated with search results, values for the parameter α, and the like.

The computing device 1100 additionally includes a data store 1108 that is accessible by the processor 1102 by way of the system bus 1106. The data store 1108 may include searchable items, labeled data, and other suitable data. The computing device 1100 also includes an input interface 1110 that allows external devices to communicate with the computing device 1000. For instance, the input interface 1110 may be used to receive a query from a user. The computing device 1100 also includes an output interface 1112 that interfaces the computing device 1100 with one or more external devices. For example, the computing device 1100 may provide an ordered list of search results to a client by way of the output interface 1112.

Additionally, while illustrated as a single system, it is to be understood that the computing device 1100 may be a distributed system. Thus, for instance, several devices may be in communication by way of a network connection and may collectively perform tasks described as being performed by the database system 1100.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A computer-implemented apparatus, comprising a processor and a memory, and further comprising:
    a receiver component that receives first scores for training points and second scores for the training points, wherein the first scores are individually assigned to the training points by a first ranker component and the second scores are individually assigned to the training points by a second ranker component; and
    a determiner component in communication with the receiver component that automatically outputs a value for a parameter a based at least in part upon the first scores and the second scores, wherein a is used to linearly combine the first ranker component and the second ranker component, wherein the linear combination of the first and second ranker components is of the form $S=S_1+aS_2$ wherein $S_1$ represents scores output by the first ranker component for the training points, $S_2$ represents scores output by the second ranker component for the training points, and S represents a final score for the linear combination of the first and second ranker components.

2. The apparatus of claim 1, further comprising a metric computer component that uses an information retrieval metric method to determine the value of a, such that the value of a corresponds to an optimal or substantially optimal linear combination of the first and second ranker components with respect to the information retrieval quality method.

3. The apparatus of claim 2, wherein the information retrieval metric method is one of Normalized Discounted Cumulative Gain, Mean Average Precision, Mean Reciprocal Rank, Bpref, Q-measure, or generalized average precision.

4. The apparatus of claim 1, wherein the linear combination of the first and second ranker components is of the form $S=(1-a)S_1+aS_2$, wherein $S_1$ represents scores output by the first ranker component for the training points, $S_2$ represents scores output by the second ranker component for the training points, and S represents a final score output by the linear combination of the first and second ranker components.

5. The apparatus of claim 1, wherein the training points include one or more of a uniform resource locator (URL) or a file.

6. The apparatus of claim 1, further comprising an interface component that locates the training points when given a query, wherein located training points are assigned scores by the first and second ranker components.

7. The apparatus of claim 1, further comprising a combiner component that automatically linearly combines the first ranker component and the second ranker component upon the determiner component outputting the value for a.

8. The apparatus of claim 1, further comprising a locator component that determines values of a that correspond to instances that scores of different training points are equal when the first and second ranker components are linearly combined using the determined value of a.

9. The apparatus of claim 1, further comprising a resolver component that recognizes values of a that cause scores of three or more training points to be equal when the first and second ranker components are linearly combined as a function of a.

10. The apparatus of claim 1, wherein the determiner component determines a value for a used to linearly combine three or more ranker components, wherein the value of a is selected to optimize the linear combination of the three or more ranker components with respect to an information retrieval metric method.

11. A computer-implemented method for linearly combining ranker components, comprising:

receiving first scores for a plurality of training points from a memory, wherein each training point in the plurality of training points is individually assigned a score by a first ranker component;

receiving second scores for the plurality of training points from a memory, wherein each training point in the plurality of training points is individually assigned a score by a second ranker component; and linearly combining the first ranker component and the second ranker component based at least in part upon the first scores and the second scores, wherein the linear combination of the first ranker component and the second ranker component is optimal or substantially optimal with respect to an information retrieval metric method;

wherein the linear combination of the first and second ranker components is of the form $S=S_1+aS_2$, wherein $S_1$ represents scores output by the first ranker component for the plurality of training points, $S_2$ represents scores output by the second ranker component for the plurality of training points, and S represents a final score for the linear combination of the first and second ranker components.

12. The method of claim 11, wherein linearly combining the first ranker component and the second ranker component comprises determining a value of a parameter a that is used to modify at least one of first scores output by the first ranker component or second scores output by the second ranker component.

13. The method of claim 12, wherein the linear combination of the first and second ranker components is of the form $S=(1-a)S_1+aS_2$, wherein $S_1$ represents scores output by the first ranker component for the plurality of training points, $S_2$ represents scores output by the second ranker component for the plurality of training points, and S represents a final score output by the linear combination of the first and second ranker components.

14. The method of claim 12, further comprising: determining a value for a that causes an output of the linear combination of the first and second ranker components to be equal for two different training points;

determining a first quality metric for a value of a that is less than the determined value of a; determining a second quality metric for a value of a that is greater than the determined value of a; comparing the first and second quality metrics; and selecting a value for a based at least in part upon the comparison.

15. The method of claim 11, wherein the information retrieval method is one of Normalized Discounted Cumulative Gain, Mean Average Precision, Mean Reciprocal Rank, Q-measure, or generalized average precision.

16. The method of claim 11, further comprising linearly combining the first ranker component and the second ranker component with a plurality of other ranker components, wherein the linear combination of the first, second, and plurality of other ranker components is based at least in part upon scores individually assigned to each training point in the plurality of training points by each of the plurality of ranker components.

17. The method of claim 11, further comprising: using the first ranker component to generate a score for each training point in the plurality of training points; and using the second ranker component to generate a score for each training point in the plurality of training points.

18. A search engine that includes a ranker component, the search engine comprising a processor and a memory, the ranker component being a linear combination of at least a first ranker component and a second ranker component, the ranker component created by way of a series of acts, the acts comprising:

receiving first scores from the memory that are individually assigned to training points by the first ranker component;

receiving second scores from the memory that are individually assigned to the training points by the second ranker component;

determining a first value of a parameter a that causes scores assigned to different training points to be equal, wherein a is used to linearly combine scores output by the first ranker component with scores output by the second ranker component, wherein the linear combination of the first and second ranker components is of the form $S=S_1+aS_2$, wherein $S_1$ represents scores output by the first ranker component for the plurality of training points, $S_2$ represents scores output by the second ranker component for the plurality of training points, and S represents a final score for the linear combination of the first and second ranker components;

assigning a second value to a that is less than the first value of a;

assigning a third value to a that is greater than the first value of a;

determining first and second quality metrics for the linear combination of the first ranker component and the second ranker component that correspond to the second value of a and the third value of a, respectively;

comparing the first and second quality metrics; and selecting either the second value of a or the third value of a to use to linearly combine the first ranker component and the second ranker component based at least in part upon the comparison.

* * * * *